United States Patent
Heuer et al.

(10) Patent No.: US 7,635,117 B2
(45) Date of Patent: Dec. 22, 2009

(54) BUSH BEARING WITH A RADIAL STIFFNESS WHICH CHANGES IN THE CIRCUMFERENTIAL DIRECTION

(75) Inventors: Karl Heuer, Nortrup (DE); Karl-Walter Palluck, Osnabrück (DE); Wolfgang Schnaars, Osnarbrück (DE); Andreas Vossel, Osnarbrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/338,599

(22) Filed: Jan. 24, 2006

(65) Prior Publication Data
US 2007/0080031 A1 Apr. 12, 2007

(30) Foreign Application Priority Data
Jan. 27, 2005 (DE) .................. 10 2005 003 945

(51) Int. Cl.
*F16F 7/00* (2006.01)
(52) U.S. Cl. .................. 267/141.1; 267/140.2
(58) Field of Classification Search ............. 267/141.1, 267/140.2, 141.7, 140.3–141.5
See application file for complete search history.

(56) References Cited

U.S. PATENT DOCUMENTS

| | | | | |
|---|---|---|---|---|
| 5,172,894 A * | 12/1992 | Hein et al. | ............. | 267/140.12 |
| 5,509,643 A * | 4/1996 | Carstens et al. | ........ | 267/140.12 |
| 6,435,486 B2 * | 8/2002 | Maier | ................... | 267/140.12 |
| 6,830,492 B1 * | 12/2004 | Magee et al. | ............. | 440/61 R |

FOREIGN PATENT DOCUMENTS

| | | | |
|---|---|---|---|
| DE | 35 25 213 A1 | | 1/1986 |
| DE | 35 36 284 A1 | | 4/1987 |
| DE | 3807644 | | 9/1989 |
| DE | 19833537 A1 | * | 2/2000 |
| DE | 198 56 694 C2 | | 6/2000 |
| DE | 696 15 726 | | 8/2002 |
| EP | 0 131 795 B1 | | 1/1985 |
| EP | 0 226 702 A1 | | 7/1987 |
| EP | 0 334 081 A1 | | 9/1989 |
| EP | 421864 A1 | * | 4/1991 |
| EP | 1 008 781 A2 | | 6/2000 |
| GB | 1 041 820 | | 9/1966 |
| JP | 05248466 A | * | 9/1993 |
| US | 4667943 | | 5/1987 |
| US | 4032125 | | 6/1997 |
| US | 5899431 | | 5/1999 |

* cited by examiner

*Primary Examiner*—Lan Nguyen
(74) *Attorney, Agent, or Firm*—Norris, McLaughlin & Marcus

(57) ABSTRACT

A bush bearing with a radial stiffness that changes in the circumferential direction. The bearing has at least one radial web with a high radial stiffness in a first radial major load-bearing direction, and at least one pocket with a significantly smaller radial stiffness than in the region of the radial web in a second radial direction which is preferably perpendicular to the first radial direction. To achieve a large force-displacement ratio and simultaneously a soft torsion characteristic, the inner element of the bearing of the invention is formed in two parts. It consists of a metal inner sleeve and a preferably also metal bearing core received in the inner sleeve. An elastomer or a rubber contour is vulcanized on the inner surface of the inner sleeve or the outer surface of the bearing core. The inner core is oversized with respect to the inner diameter of the elastomer contour. The bearing core is pressed into the inner sleeve, but does not adhere to it.

11 Claims, 6 Drawing Sheets

BUSH BEARING WITH A RADIAL STIFFNESS WHICH CHANGES IN THE CIRCUMFERENTIAL DIRECTION

BACKGROUND OF THE INVENTION

1. Field of the Invention

The invention is directed to a bush bearing, preferably a rubber-metal-bearing, in the form of a bushing having zones with different or changing radial stiffness arranged in the circumferential direction. The different radial stiffness or force-displacement characteristic can be achieved by providing the bearing in a first major radial load-bearing direction with at least one radial web having a high stiffness, which is formed by consecutive layers of alternating elastomer and metal elements and/or plastic elements. At least one pocket is formed in a second radial direction which is preferably oriented perpendicular to the first radial direction, wherein the pocket reduces the radial stiffness of the bearing in this region.

Bush bearings have to satisfy quite different requirements because they are used in many different applications. The different design of the bearings is evident in particular in automotive applications. Bush bearings with different radial stiffnesses or force-displacement characteristics along their circumference are required, inter alia, for supporting chassis components. The bearings in these applications have different radial stiffnesses with a large force-displacement ratio, i.e., they have regions with a high radial stiffness and other regions with a comparatively much smaller radial stiffness. These conventional types of bearings can be implemented by adapting the bearing geometry, so that a radial web with a high stiffness is formed in at least one radial direction and, preferably perpendicular thereto, at least one pocket is formed with an elastomer bearing body having a smaller stiffness in that region.

2. Description of Related Art

A bearing constructed in this manner is known, for example, from DE 35 36 284 A1. This bearing attains its high stiffness in the region of the radial web by constructing the radial web of an alternating layered sequence of elastomer and intermediate elements of sheet metal, which also produces a relatively large force-displacement ratio in the region of the web and the pocket arranged perpendicular thereto. In the bearing described in the document, the bearing body is vulcanized on and adheres to a metal inner element. As a result, the bearing described in the document has a stiff torsion which is undesirable and unsuitable for many applications. Other applications are known which call for a still higher force-displacement ratio between the circumferential regions representing the radial web and the pocket.

It is known to lower the torsion of bush bearings by providing an additional inner low-torsion bearing or an intermediate tube. This design, however, further complicates the bearing geometry and also increases the manufacturing cost.

It is therefore an object of the invention to form a bush bearing of simpler design with at least one radial web and a pocket, while still providing a large force-displacement ratio and simultaneously a soft torsion characteristic.

SUMMARY OF THE INVENTION

The object is solved by a bush bearing with the features of the independent claim. Advantageous embodiments and modifications of the bearing of the invention are recited in the dependent claims.

The proposed bush bearing with a radial stiffness that changes in the circumferential direction is made of an inner element and an elastomer bearing body which surrounds the inner element at least in sections and is configured to be received by an outer sleeve or a receiving opening. At least one radial web with a high radial stiffness and a pocket with a stiffness that is lower than that of the radial web are formed by the elastomer bearing body. The radial web is formed by elements made of an elastomer and metal and/or plastic material that are layered in the radial direction. An elastomer stop element is provided on the inner element to form the pocket, which is spaced apart from the outer sleeve or the receiving opening in which the bearing is received, so that the bearing body has in that region a smaller width or a smaller diameter than in the region of the radial web. The bearing has a high stiffness in the latter region, whereas the radial stiffness in the region of the pocket is significantly reduced. The larger force-displacement ratio between the regions of high stiffness and low stiffness than would be attainable with conventional solutions is achieved by providing a high radial stiffness in the region of the radial web. Advantageously, a significantly higher stiffness than with conventional solutions is possible by a special configuration of the inner element of the inventive bearing in the direction of the radial web, while at the same time attaining a smaller return force for torsion, i.e., a soft torsion. According to the invention, the inner element of the proposed bearing is formed in two parts and includes a metal inner sleeve and a likewise metal bearing core received by the sleeve. An elastomer or rubber core is vulcanized on the inner surface of the inner sleeve or on the outer surface of the bearing core. The inner core which depending on the application of the bearing can be formed as a tubular, i.e. hollow, or as a predominantly solid element, which is then inserted in the inner sleeve of the inner element without adhering to it, i.e., the inner core does not adhere to the sleeve. Instead, the inner core is pressed into the inner sleeve.

Because the elastomer or rubber contour, as mentioned above, can be vulcanized either on the inner surface of the inner sleeve or on the outer surface of the bearing core received by the sleeve, two basic variants of the inventive bearing are produced which operate in a similar manner. The embodiment where the bearing core is oversized in relation to the inside diameter of the inner sleeve can be understood as follows. In the first preferred variant, where the elastomer contour is vulcanized on the inner surface of the inner sleeve, the inner diameter of the inner sleeve is defined by the diameter in the region of the elastomer contour which has to be added to the inner sleeve. The bearing core which has an outer surface without an elastomer contour is oversized with respect to the inner diameter of the inner sleeve having the elastomer contour.

Conversely, in the second variant where an elastomer contour is vulcanized on the outer surface of the bearing core, the outer dimension of the bearing core is defined by the diameter in the region of the elastomer contour, and the inner diameter of the inner sleeve which does not have an elastomer on its inner surface is smaller than the outer diameter. However, in both variants, the bearing core is pressed into the inner sleeve, but is not connected thereto by adhesion. These embodiments produce, on one hand, a soft torsion characteristic and, on the other hand, create a pretension in the elastomer regions that are vulcanized on the inside of the inner sleeve or on the outer surface of the bearing core, when the bearing core is pressed into the inner sleeve. The pretension increases the radial stiffness of the bearing, wherein the higher radial stiffness has an immediate effect on the radial web, while only gradually taking effect in the region of the pocket following an extended linear force displacement range.

With the design of the bearing according to the invention, a force-displacement ratio of the radial stiffness of up to 12,000 N/mm:130 N/mm could be attained in the region of the radial web and the pocket.

The bearing core, which is made of metal or plastic, with the exception of the possibly vulcanized elastomer contour, has preferably an essentially cylindrical ouside profile, and can be formed, as mentioned above, as a hollow cylinder or a largely solid element.

According to an advantageous embodiment of the bearing, the diameter of the cylindrical element forming the bearing core made of metal or plastic is smaller in the region of the elastomer contour. If the elastomer contour is vulcanized on the outer surface of the bearing core, the diameter is reduced only in the regions without the elastomer, or the above discussion only addresses the diameter of the bearing core while leaving out the elastomer contour. Consequently, an axial shoulder is formed on both sides of the elastomer contour regardless if the elastomer contour is vulcanized on the inner surface of the inner sleeve or on the outer surface of the bearing core. This further reduces the torsion stiffness.

The inner sleeve of the inner element can have an outer contour that is different from a cylindrical shape, and which can optionally be almost square. In another advantageous embodiment of the bearing of the invention, notches are formed on the outer surface of the inner sleeve, i.e., in the region of the contact surfaces between the inner element and the elastomer bearing body, for providing a high-quality fit between the inner element and the elastomer bearing body.

According to a particularly advantageous embodiment of the proposed bearing, the elastomer stop face disposed on the inner element in the region of the pocket is, in relation to the longitudinal axis of the bearing, shaped as a wedge on both sides of a plane that perpendicularly intersects this axis, thereby increasing the distance between the stop elements and the bearing receptacle (outer sleeve or receiving opening at the installation site) in the direction of the axial bearing ends. The wedge surfaces move contamination entering the bearing out of the outer sleeve or the receiving opening. Advantageously, this also gradually increases the radial stiffness of the bearing characteristic in the region of the pocket. The bearing characteristic has an extended linear region in the region of the pocket, followed by a section of the characteristic curve that progressively increases.

In another advantageous embodiment of the bearing, the outer region of the layer sequence forming the radial web is integrated in a ring or a cylindrical outer element, which is connected with the radial web by vulcanization.

According to a practical embodiment of the bearing, a washer having a diameter greater than the diameter of the bearing core may be arranged on one or both axial bearing ends, thereby reducing the surface pressure when the bush bearing is mounted. A similar effect can advantageously be achieved, without adding another part, by forming a flange on one of the axial ends of the bearing core. In this case, the bearing core and the corresponding [flange] can be formed by cold extrusion or sintering.

BRIEF DESCRIPTION OF THE DRAWING

An exemplary embodiment of the invention will now be described in detail. The corresponding drawings show in.

DETAILED DESCRIPTION OF THE INVENTION

Figure 1:
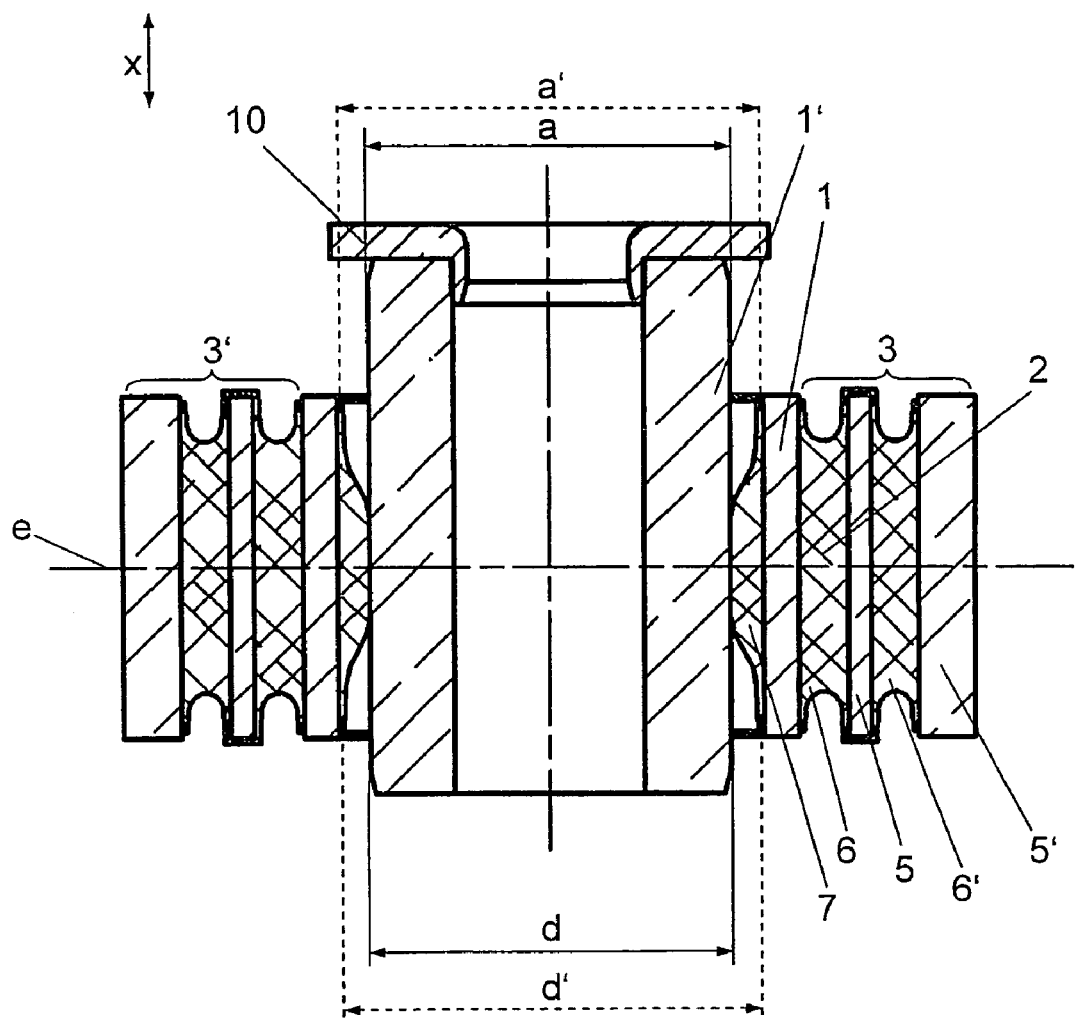
FIG. 1 an exemplary embodiment of the bearing according to the invention in a longitudinal cross-section extending through the radial web.

FIG. 1 shows a cross-sectional view through the radial web along the bearing axis x of an exemplary embodiment of the bearing of the invention.

The bearing is constructed in a conventional manner of an inner element 1, 1' and an elastomer bearing body 2 which surrounds the inner element 1, 1' at least in sections. In the region of the radial webs 3 visible in the Figure (which due to their unbroken construction could also be referred to as a single radial web), the bearing body 2 is formed by a sequence of layers having alternating elastomer regions 6, 6' and metal and/or plastic elements 5, 5'. The outer layer is made of metal elements 5' or plastic elements, preferably however of metal elements 5'. The metal elements 5' have an outer contour made of arcuate segments and function as a holding element or holding plate when the bearing is installed in a receiving opening 9 or a sleeve. These segments can also be integrated in an outer ring, which may simplify assembly.

The Figure shows clearly the particular shape of the inner element 1, 1'. The inner element 1, 1' is made of an inner sleeve 1, and a rubber contour 7 vulcanized on the inner surface of the inner sleeve 1 and adapted to receive a likewise sleeve-like bearing core 1', which is also sleeve-like and is neither connected to nor adheres to rubber contour 7. The exemplary hollow-cylindrical bearing core 1' has an oversize a with respect to the inner diameter d of the inner sleeve 1, which is determined by the rubber contour 7 on the inner surface, and is pressed into the inner sleeve 1. This particular configuration (in another embodiment where an elastomer contour 7 is vulcanized on the outer surface of the bearing core 1', the inner diameter of the inner sleeve 1 would be defined by d' and the oversize by a', representing the oversize of the elastomer contour 7 with respect to the inside diameter d' of the inner sleeve 1) produces, in particular, the soft torsion characteristic of the bearing. Conversely, when the bearing core 1' is pressed into the inner sleeve 1, a pretension is created in the rubber contour 7 vulcanized on the inside of the inner sleeve, which produces a high radial stiffness. This arrangement promotes the fundamental radial stiffness of the bearing in the region of the radial webs 3, 3'. This arrangement also produces in the region of the pocket 4, 4', which is clearly shown in FIGS. 2 and 4, the extended linear force-displacement characteristic of the bearing which, after striking the stop faces, progressively increases to high values, aided by the pretensioned rubber contour 7 disposed inside the inner sleeve 1.

Figure 2:
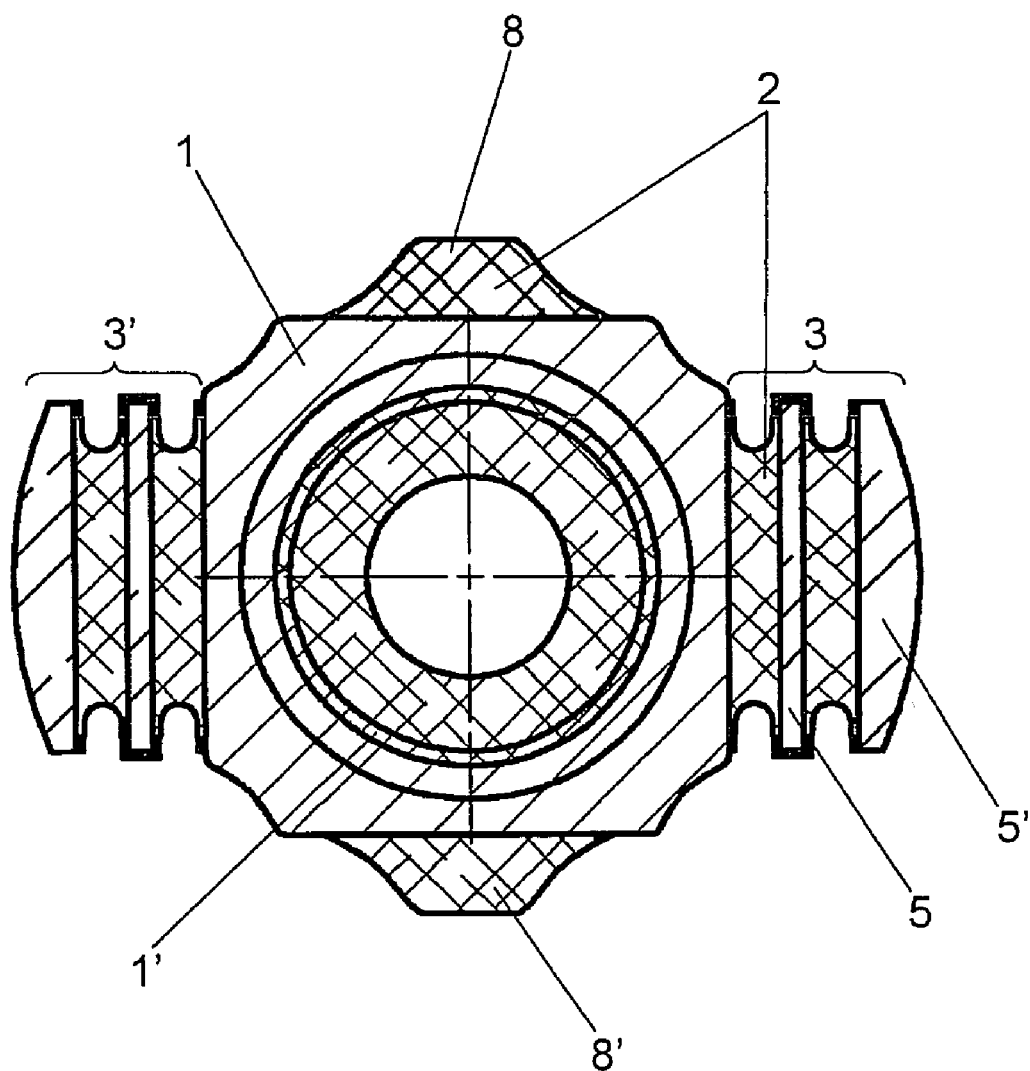
FIG. 2 a radial cross-section of the bearing of FIG. 1.

FIG. 2 shows the aforedescribed embodiment of the bearing in a radial cross-sectional view through the bearing. The radial webs 3, 3' and the elastomer stop elements 8, 8' are clearly visible. The pockets 4, 4' are formed in the region of the stop elements 8, 8' following installation of the bearing in a receiving opening 9. The outer surface of the stop elements 8, 8' is wedge-shaped on both sides of the plane e. The outside profile of the inner sleeve 1 of the exemplary bearing is not cylindrical. The outside profile could also have the shape of a hollow cylinder.

Figure 3:
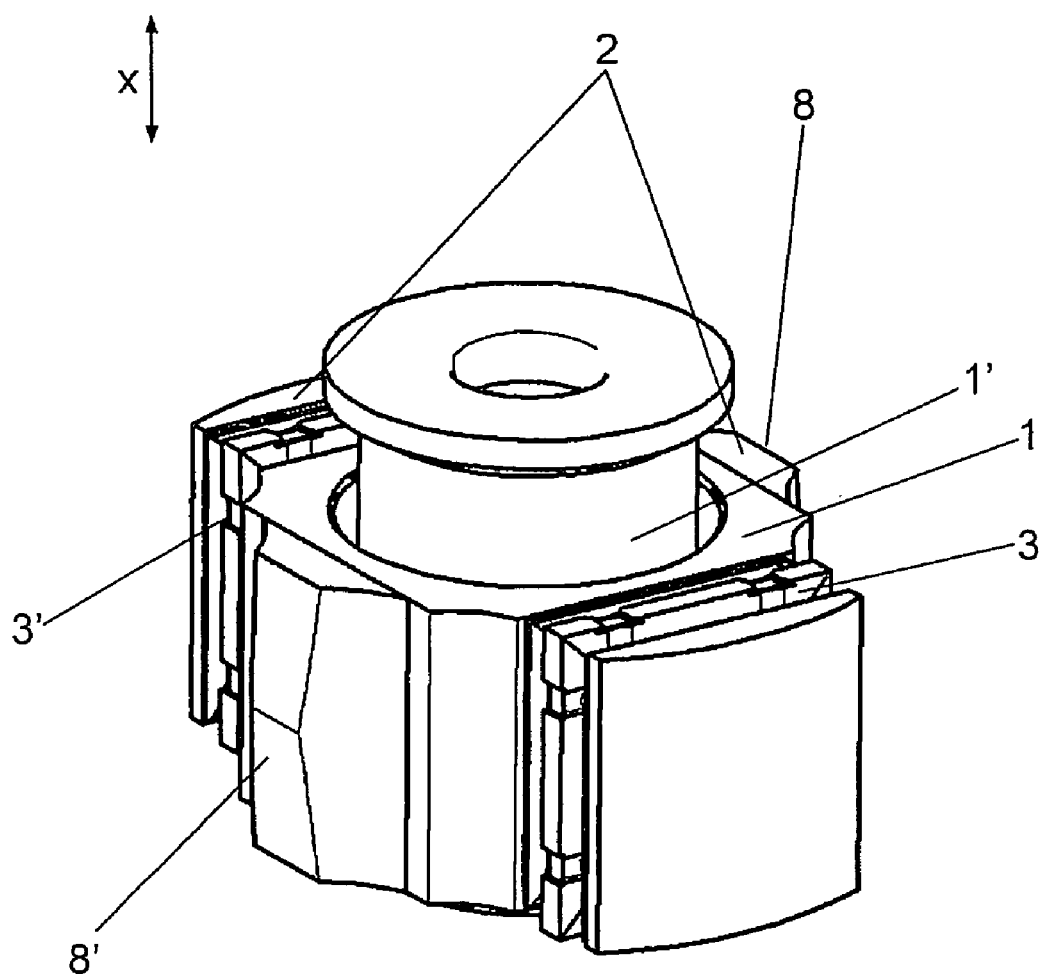
FIG. 3 a perspective view of the bearing according to FIGS. 1 and 2.
Figure 4:
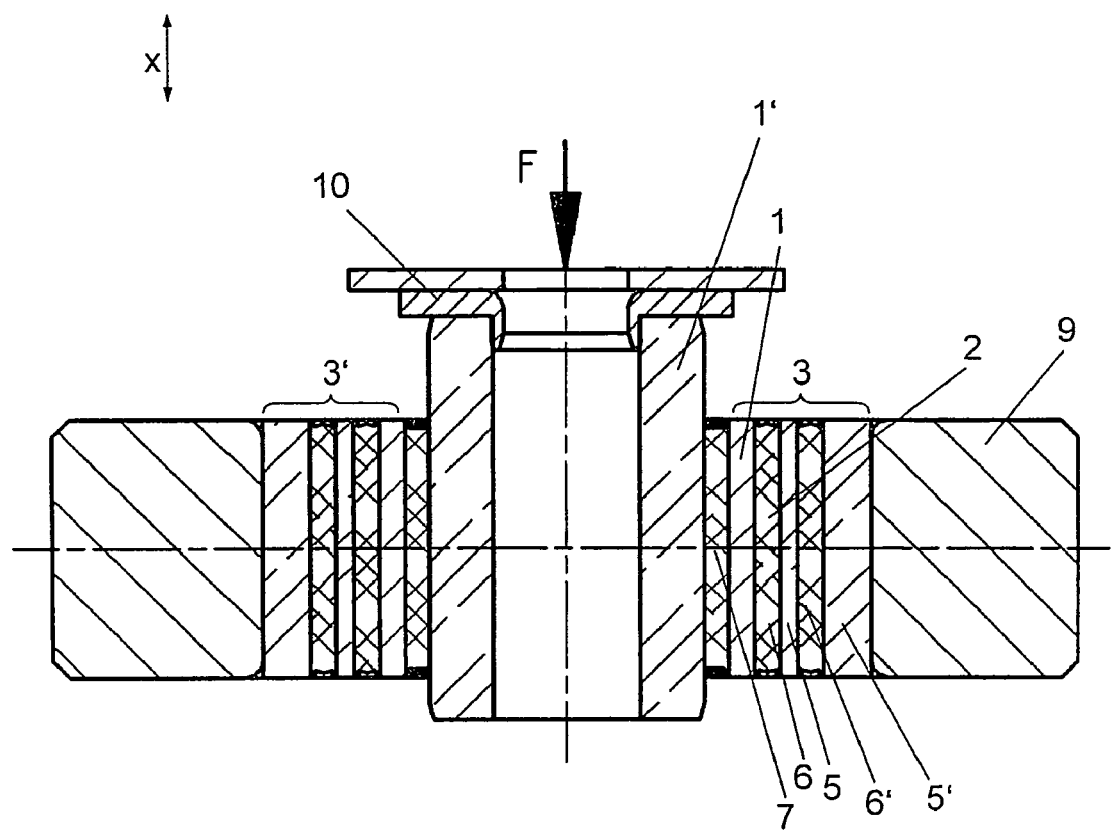
FIG. 4 the bearing of FIG. 1 after installation in a receiving opening.
Figure 5:
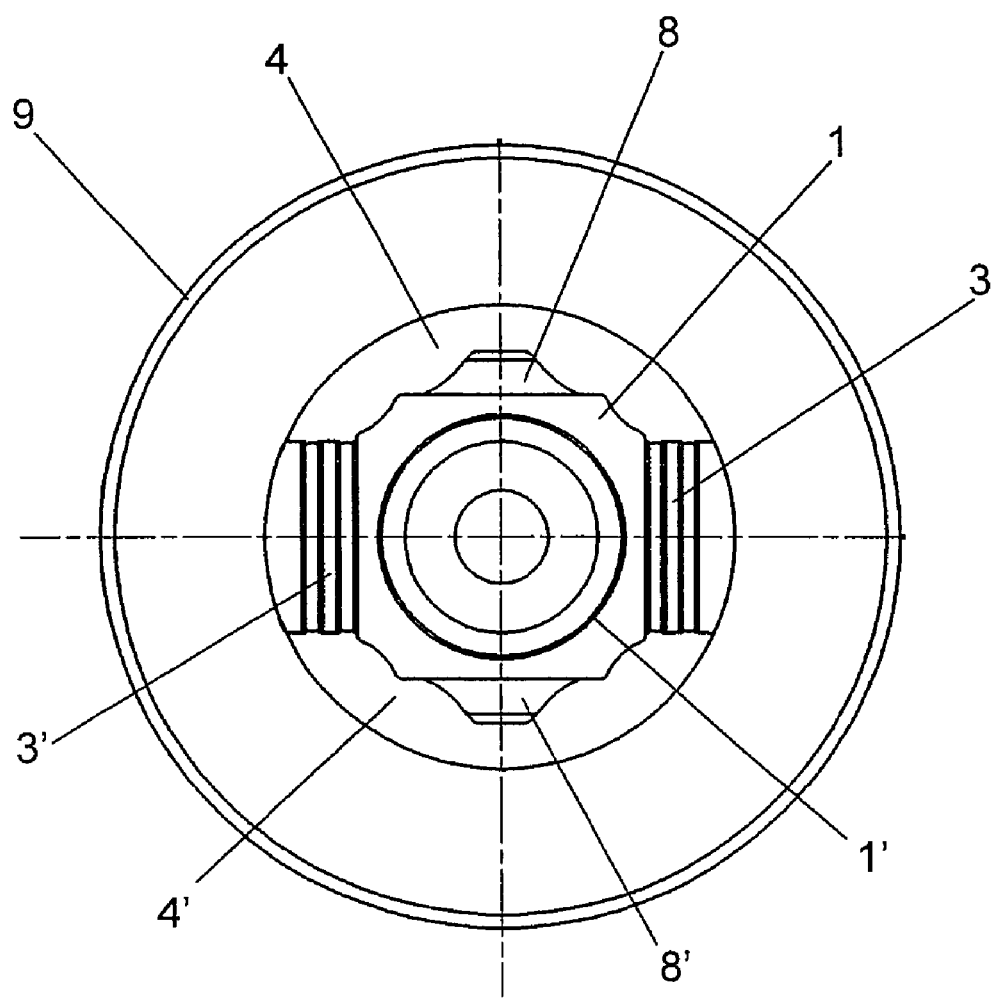
FIG. 5 the bearing of FIG. 2 after installation in a receiving opening.

FIG. 3 shows the aforedescribed bearing in a perspective view which very clearly shows the bearing geometry. In addition, FIGS. 4 and 5 show the bearing of the invention after installation in a receiving opening 9 located, for example, in the area of a connecting rod of a vehicle. The washer 10 disposed in the area of one of the axial bearing ends prevents contamination from entering the bearing and reduces the axial surface pressure of the bearing during installation.

Figure 6:
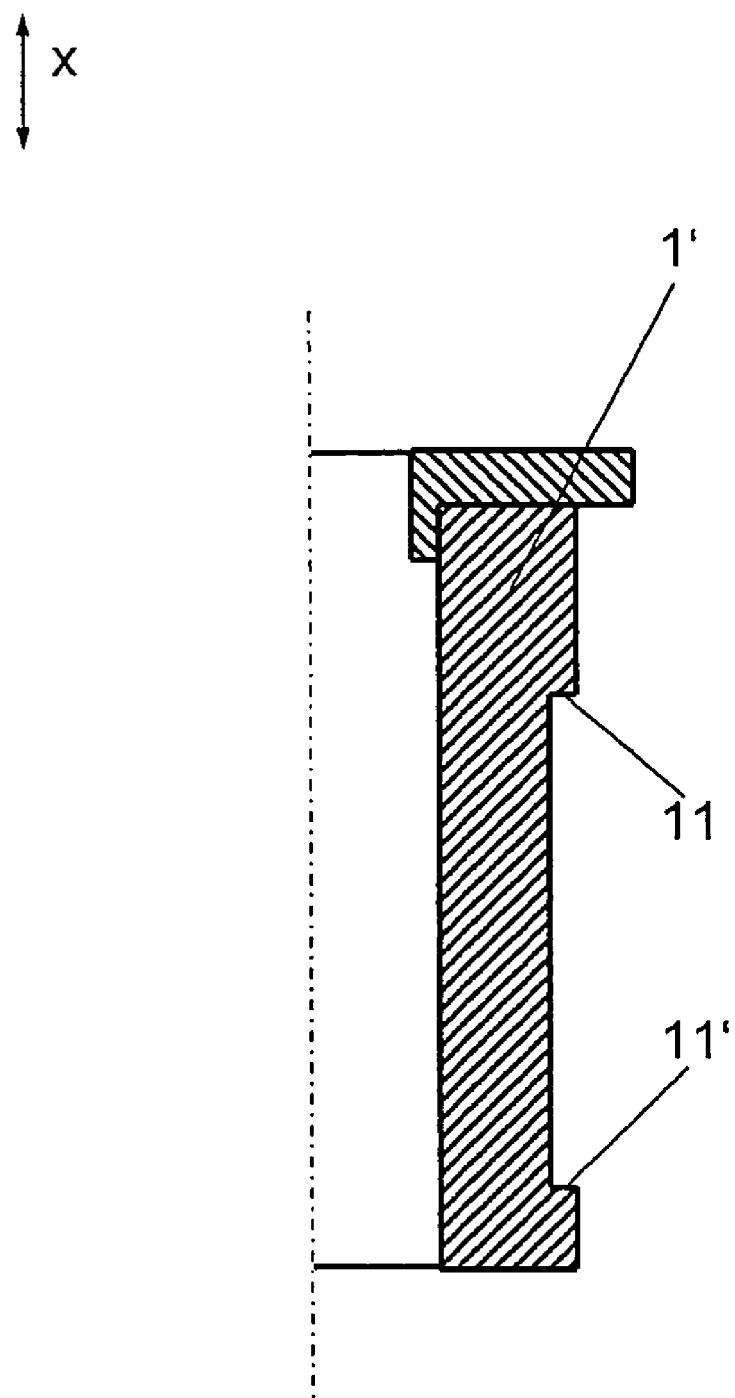
FIG. 6 an axial cross-sectional view of a modified embodiment showing one half of the bearing core.

FIG. 6 shows an axial cross-sectional view of one half of the bearing core 1' of a modified embodiment of the bearing. In this embodiment, the diameter of the essentially cylindrical element is reduced in the region where its outer surface makes contact with the elastomer contour after having been pressed into the inner sleeve 1. Two shoulders 11, 11' are then formed which prevent the rubber from disengaging or escaping, or being crushed when the bearing core 1' is pressed into the inner sleeve 1. This configuration still further reduces the torsion stiffness.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

Every issued patent, pending patent application, publication, journal article, book or any other reference cited herein is each incorporated by reference in their entirety.

What is claimed is:

1. A bush bearing, with a radial stiffness that changes in the circumferential direction, comprising:
an inner element having a metal inner sleeve, a bearing core, and an annular elastomer contour interposed disposed between the inner sleeve and the bearing core, wherein the elastomer contour is vulcanized only on an inner surface of the inner sleeve, and an elastomer bearing body that surrounds the inner element at least along sections and which is adapted to be received in an outer sleeve or in a receiving opening, with at least one radial web with a high radial stiffness and at least one pocket with a smaller radial stiffness than that of the radial web, wherein elements made of metal or plastic are incorporated in the bearing body in a region of the radial web and arranged on outer radial surfaces of the bearing body so as to form a radial layer sequence with the elastomer, wherein the bearing core is oversized with respect to an inner diameter of the elastomer contour and non-adherently contacts the elastomer contour along its entire circumference, wherein the inner element has a longitudinal axis; and an outer surface of the inner sleeve radially outward relative to the longitudinal axis is only partially enclosed by the radial web, leaving a remaining portion of the outer surface of the inner sleeve exposed.

2. The bush bearing according to claim 1, wherein the bush bearing has a force-displacement ratio of up to 12,000 N/mm: 130 N/mm between the radial web and the pocket.

3. The bush bearing according to claim 1, wherein the bearing core of the inner element, with the exception of the possible vulcanized elastomer contour, is formed by an element made of metal or plastic that has an essentially cylindrical outside profile.

4. The bush bearing according to claim 3, wherein the diameter of the cylindrical element forming the bearing core is reduced in the region of the elastomer contour, so that an axial shoulder is formed on both sides of the elastomer contour.

5. The bush bearing according to claim 1, wherein the bearing core is formed as a hollow cylinder.

6. The bush bearing according to claim 1, wherein the inner sleeve of the inner element has an outer contour different from a cylindrical profile.

7. The bush bearing according to claim 1, wherein the pocket(s) are formed by stop elements connected to the inner sleeve, and wherein the outer surfaces of the stop elements, in relation to the longitudinal axis of the bearing, have the shape of a wedge on both sides of a plane which perpendicularly intersects the longitudinal axis, with the wedge increasing the distance of the stop elements with respect to an inner surface of an outer sleeve receiving the bearing or a receiving opening in the direction of the axial bearing end.

8. The bush bearing according to claim 7, wherein the pockets(s) are formed by the stop elements, the inner sleeve and the radial webs.

9. The bush bearing according to claim 1, wherein an outer region of the radial layer sequence forming the radial web is integrated in a ring which is connected with the radial web by vulcanizing.

10. The bush bearing according to claim 1, wherein for reducing the surface pressure when the bush bearing is mounted at the installation site, a washer having a diameter greater than an outer diameter of the bearing core is arranged on at least one axial end of the bearing core.

11. The bush bearing according to claim 1, wherein a flange is formed on one axial end of the bearing core.

* * * * *